US008676818B2

(12) United States Patent
Curbera et al.

(10) Patent No.: US 8,676,818 B2
(45) Date of Patent: Mar. 18, 2014

(54) DYNAMIC STORAGE AND RETRIEVAL OF PROCESS GRAPHS REPRESENTATIVE OF BUSINESS PROCESSES AND EXTRACTION OF FORMAL PROCESS MODELS THEREFROM

(75) Inventors: Francisco Phelan Curbera, Hawthorne, NY (US); Paul T. Keyser, Hawthorne, NY (US); Rania Khalaf, Cambridge, MA (US); Geetika Tewari Lakshmanan, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/772,597

(22) Filed: May 3, 2010

(65) Prior Publication Data

US 2011/0270853 A1    Nov. 3, 2011

(51) Int. Cl.
*G06F 17/30* (2006.01)

(52) U.S. Cl.
USPC ............ 707/755; 707/798; 707/756; 707/757

(58) Field of Classification Search
CPC ................................. G06F 17/30; G06F 17/00
See application file for complete search history.

(56) References Cited

U.S. PATENT DOCUMENTS

| | | | | |
|---|---|---|---|---|
| 4,206,809 A * | 6/1980 | Jones | 166/252.1 |
| 4,674,829 A * | 6/1987 | Bulmer et al. | 385/41 |
| 4,853,867 A * | 8/1989 | Matsumura | 700/180 |
| 4,972,314 A * | 11/1990 | Getzinger et al. | 711/149 |
| 5,018,077 A * | 5/1991 | Healey | 715/209 |
| 5,067,165 A * | 11/1991 | Nishida | 382/195 |
| 5,510,809 A * | 4/1996 | Sakai et al. | 345/440.2 |
| 5,550,970 A * | 8/1996 | Cline et al. | 715/772 |
| 5,762,686 A * | 6/1998 | Borzio | 95/82 |
| 5,819,022 A * | 10/1998 | Bandat | 714/16 |
| 5,852,449 A * | 12/1998 | Esslinger et al. | 345/473 |
| 5,878,407 A * | 3/1999 | Olgac | 1/1 |
| 5,966,072 A * | 10/1999 | Stanfill et al. | 340/440 |
| 6,031,547 A * | 2/2000 | Kennedy | 345/440 |
| 6,144,379 A * | 11/2000 | Bertram et al. | 715/835 |
| 6,159,329 A * | 12/2000 | Tschanz | 156/277 |
| 6,222,939 B1 * | 4/2001 | Wiskott et al. | 382/209 |
| 6,229,551 B1 * | 5/2001 | Huang | 345/440 |
| 6,247,121 B1 * | 6/2001 | Akkary et al. | 712/239 |
| 6,356,659 B1 * | 3/2002 | Wiskott et al. | 382/209 |
| 6,449,587 B1 * | 9/2002 | Jungst | 703/1 |

(Continued)

OTHER PUBLICATIONS

Wu, Ming-Chuan, "Encoded Bitmap Indexes and Their Use for Data Warehouse Optimization," Doctorate Thesis, Technical University of Darmstadt, Germany, Jan. 21, 2001, pp. 1-231.*

(Continued)

*Primary Examiner* — Farhan Syed
(74) *Attorney, Agent, or Firm* — F. Chau & Associates, LLC; William J. Stock, Esq.

(57) ABSTRACT

A method for modeling a process includes receiving a plurality of graphs representing processes wherein for each graph. A sequence of process steps of the processes are represented as nodes and edges connecting pairs of nodes represent transitions between process steps. A numeric value representative of graph appearance for each of the plurality of received graphs is calculated. Each of the plurality of received graphs is stored within a tree-like data structure according to its corresponding numeric value. Each of the above steps is performed using a computer system.

15 Claims, 4 Drawing Sheets

(56) References Cited

U.S. PATENT DOCUMENTS

| | | | |
|---|---|---|---|
| 6,502,105 B1* | 12/2002 | Yan et al. | 1/1 |
| 6,539,339 B1* | 3/2003 | Berry et al. | 702/186 |
| 6,556,949 B1* | 4/2003 | Lyon | 702/182 |
| 6,565,514 B2* | 5/2003 | Svanerudh et al. | 600/486 |
| 6,603,477 B1* | 8/2003 | Tittle | 345/440 |
| 6,654,907 B2* | 11/2003 | Stanfill et al. | 714/16 |
| 6,751,789 B1* | 6/2004 | Berry et al. | 717/130 |
| 6,768,958 B2* | 7/2004 | Ivanovic et al. | 702/94 |
| 6,816,902 B1* | 11/2004 | Bandat et al. | 709/226 |
| 6,829,755 B2* | 12/2004 | Gutwin et al. | 716/113 |
| 6,911,978 B2* | 6/2005 | Nomiyama et al. | 345/440 |
| 6,922,661 B2* | 7/2005 | Carrillo | 703/2 |
| 7,013,243 B2* | 3/2006 | Koizumi et al. | 702/189 |
| 7,222,302 B2* | 5/2007 | Hauser et al. | 715/734 |
| 7,337,443 B2* | 2/2008 | Welland et al. | 718/102 |
| 7,743,382 B2* | 6/2010 | Schumacher et al. | 718/106 |
| 7,840,949 B2* | 11/2010 | Schumacher et al. | 717/149 |
| 8,169,345 B2* | 5/2012 | Evans et al. | 341/61 |
| 8,265,979 B2* | 9/2012 | Golani et al. | 705/7.27 |
| 8,321,841 B2* | 11/2012 | Leung | 717/126 |
| 8,429,631 B2* | 4/2013 | Schumacher et al. | 717/149 |
| 2004/0249645 A1* | 12/2004 | Hauser et al. | 705/1 |
| 2004/0260590 A1* | 12/2004 | Golani et al. | 705/8 |
| 2004/0268350 A1* | 12/2004 | Welland et al. | 718/100 |
| 2005/0097561 A1* | 5/2005 | Schumacher et al. | 718/106 |
| 2006/0015857 A1* | 1/2006 | Gold et al. | 717/139 |
| 2006/0218534 A1* | 9/2006 | Kahlon et al. | 717/124 |
| 2007/0021995 A1* | 1/2007 | Toklu et al. | 705/7 |
| 2007/0150936 A1* | 6/2007 | Maes | 726/1 |
| 2007/0271562 A1* | 11/2007 | Schumacher et al. | 718/100 |
| 2009/0094074 A1* | 4/2009 | Nikovski et al. | 705/7 |
| 2009/0177508 A1* | 7/2009 | Leung | 705/7 |
| 2009/0303239 A1* | 12/2009 | Ang et al. | 345/440 |
| 2010/0262968 A1* | 10/2010 | Schumacher et al. | 718/102 |
| 2011/0004880 A1* | 1/2011 | Schumacher et al. | 718/102 |
| 2011/0270853 A1* | 11/2011 | Curbera et al. | 707/755 |
| 2013/0041925 A1* | 2/2013 | Balko | 707/810 |
| 2013/0073334 A1* | 3/2013 | Favre et al. | 705/7.27 |

OTHER PUBLICATIONS

Adabi, Daniel, et al., "Column-Stores vs. Row-Stores: How Different Are They Really?", Jun. 9-12, 2008, ACM SIGMOD '08, pp. 1-14.*

Chen, Changqing, "Indexing of Multidimensional Discrete Data Spaces and Hybrid Extensions," 2009, Doctorate Thesis, Michigan State University, pp. 1-185.*

Maneewongvatana, Songrit, "Bitmap Index Partition Techniques for Continuous and High Cardinality Discrete Attributes," 2003, InTech, pp. 1-9.*

* cited by examiner

| | | Destination | | | | | |
|---|---|---|---|---|---|---|---|
| | | A | B | C | D | E | F |
| Origin | A | 0.1 | 0.1 | 0.8 | 0.0 | 0.0 | 0.0 |
| | B | 0.0 | 0.0 | 0.0 | 1.0 | 0.0 | 0.0 |
| | C | 0.1 | 0.0 | 0.0 | 0.9 | 0.0 | 0.0 |
| | D | 0.0 | 0.0 | 0.0 | 0.0 | 0.5 | 0.5 |
| | E | 0.0 | 0.0 | 0.0 | 0.0 | 0.0 | 0.0 |
| | F | 0.0 | 0.0 | 0.0 | 0.0 | 0.0 | 0.0 |

DYNAMIC STORAGE AND RETRIEVAL OF PROCESS GRAPHS REPRESENTATIVE OF BUSINESS PROCESSES AND EXTRACTION OF FORMAL PROCESS MODELS THEREFROM

BACKGROUND OF THE INVENTION

1. Technical Field

The present disclosure relates to process graphs, and more particularly, to a method and system for the dynamic storage and retrieval of process graphs.

2. Discussion of Related Art

A business process is a sequence of procedural steps that are performed to accomplish a particular task or goal. Steps may be performed manually, with the assistance of computers or fully automatically. As there are many ways in which a task can be accomplished, there is a great deal of variety in executing business processes. Often, organizations seek to streamline business operations and maintain a consistently high degree of quality by formalizing business processes. Formalization of business processes may include promulgation of formal process models in the form of published procedures and other policy statements.

However, even after organizations promulgate formalized business processes, it may be difficult to monitor and enforce compliance and determine the extent to which actual practice aligns with formalized processes. Accordingly, in light of the difficulties associated with monitoring and enforcing compliance, organizations may lack the ability to quickly and effectively optimize business operations.

Business process management (BPM) is an approach to managing an organization that may utilize information technology to facilitate the performance of various business processes by providing a technological platform upon which business process steps may be executed. While BPM may seek to continuously improve business processes, the difficulties associated with monitoring and enforcing compliance of formal business processes may limit the effectiveness of BPM.

SUMMARY

A method for modeling a process includes receiving a plurality of graphs representing processes wherein for each graph. A sequence of process steps of the processes are represented as nodes and edges connecting pairs of nodes represent transitions between process steps. A numeric value representative of graph appearance for each of the plurality of received graphs is calculated. Each of the plurality of received graphs is stored within a tree-like data structure according to its corresponding numeric value. Each of the above steps is performed using a computer system.

A method for modeling a process includes receiving a plurality of graph snapshots representing a dynamic process at various instantaneous points in time. For each snapshot, a sequence of process steps of the processes are represented as nodes and edges connecting pairs of nodes represent transitions between process steps. A numeric value representative of graph appearance for each of the plurality of received snapshots is calculated. Each of the plurality of received snapshots is stored within a tree-like data structure according to its corresponding numeric value. Each of the above steps is performed using a computer system.

A computer program product for modeling a process includes a computer readable storage medium having computer readable program code embodied therewith. The computer readable program code includes computer readable program code configured to receive a plurality of graphs representing processes wherein for each graph, a sequence of process step of the processes are represented as nodes and edges connecting pairs of nodes represent transitions between process steps, computer readable program code configured to calculate a numeric value representative of graph appearance for each of the plurality of received graphs, and computer readable program code configured to store each of the plurality of received graphs within a tree-like data structure according to its corresponding numeric value.

A method for modeling a process includes receiving a first plurality of graphs representing processes. For each graph, a sequence of process steps of the processes are represented as nodes and edges connecting pairs of nodes represent transitions between process steps. A first image comprising a matrix of colored elements is generated. Each colored element is a representation of a corresponding graph of the received first plurality of graphs and the color of each colored element is determined by calculating a color value that is dependent upon a structure of the corresponding received graph. The structure includes an arrangement of nodes and edges within the graph. The generated first image is displayed. Each of the above steps is performed using a computer system.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

In practice, actual business processes may be executed in a manner that deviates from a prescribed and/or formalized procedure. This deviation may be caused by hurdles and inefficiencies that were unforeseen at the point in which the procedures were formalized, evolution of a process over time, and/or employee non-compliance. Accordingly, accurately gauging actual process performance may be a useful endeavor for improving workflow.

Exemplary embodiments of the present invention may seek to provide an automated approach for modeling actual business process execution. By accurately modeling actual business process execution, organizations may be able to compare the actual processes with formalized processes and other directives to ascertain a level of agreement and to isolate points of deviation so that remedial action may be taken to achieve compliance with formalized processes and to influence future policy.

Exemplary embodiments of the present invention may be able to represent actual business process execution in terms of a graph in which each node of the graph represents a step in the business process and a series of edges connect various nodes to represent observed transitions from one node to the next. The thickness of each edge may be proportional to the observed propensity with which execution of a first step leads to the execution of a second step. Accordingly, a single graph may be able to illustrate how a business process is actually being performed over a number of process executions.

Graph generation may be fully automated so that actual performance of a business process may be represented in a straightforward and intuitive manner without consuming significant organizational resources. Graph generation may be performed by collecting one or more activity logs that are generated in the ordinary course of business as process steps are completed within various computerized platforms that tend to keep detailed activity logs. The collected activity logs may be automatically parsed to identify process steps and ascertain the character of workflow from one process step to the next. It is this information that may be used to generate the graph.

These graphs may be periodically updated or updated in real-time. Graphs may then be compared against a formalized business process to identify points of departure. Graphs may also be compared against prior graphs to determine change. Graphs may also be compared with similar graphs from other organizational subdivisions or other organizations to provide an indication as to how different entities handle similar tasks. Other important uses for graphs so generated may be found, and the invention is not limited to particular uses for the graphs so generated. Regardless of the nature of the analysis performed, the automatic generation and presentment of these graphs may be used with existing BPM systems, or by themselves, to streamline organizational operations and ensure quality.

An example of a business process graph generated as described herein is presented in FIG. 4 and is described in further detail below.

Figure 1:
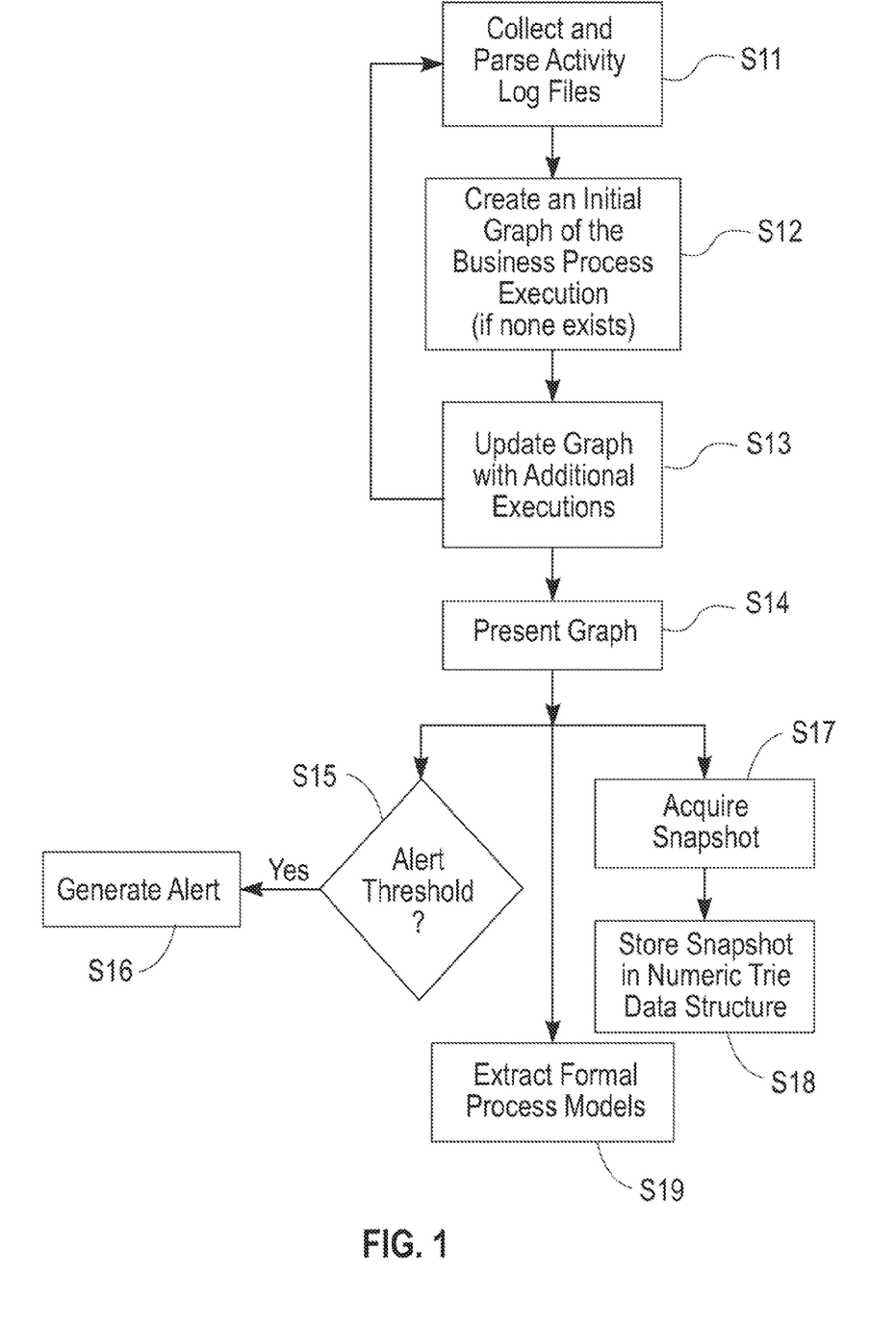
FIG. 1 is a flow chart illustrating generation of an observed business process graph according to exemplary embodiments of the present invention.

FIG. 1 is a flow chart illustrating the generation of the above-identified observed business process graphs according to exemplary embodiments of the present invention. First, activity log files may be collected and parsed (Step S11). Collection of the activity log files may include retrieving stored activity log files from one or more computerized systems that are involved in the execution of the given business process under evaluation. Where activity logs are collected from multiple sources, cross-referencing may be performed to match up business process steps so that individual business process executions may be traced from business step to business step even where various steps have been recorded across multiple activity log files. Parsing of the activity log or logs may include identifying actual business process steps that have been performed and determining a sequence in which business process steps have been executed.

Exemplary embodiments of the present invention may utilize known business provenance based systems for combining activity logs across multiple sources to produce a single execution log that contains a coherent listing of events related to the execution of a single instance of an end-to-end business process. Business provenance is understood to be the process of capturing and managing the lineage of business artifacts to discover functional, organizational, date and resource aspects of a business. Accordingly, business provenance may be used according to exemplary embodiments of the present invention to collect and parse activity logs to determine an order in which process steps have been performed and thus may be used to automatically discover what exactly has occurred during the business process execution by collecting, correlating and analyzing operational data such as data obtained from activity logs.

Examples of business provenance based systems that may be used in conjunction with exemplary embodiments of the present invention may be found, for example, within U.S. patent application Ser. Nos. 12/265,975; 12/265,986; 12/265,993; and 12/266,052, each of which are incorporated herein in its entirety.

After the activity log files have been collected and parsed, a first business process execution may be graphed (Step S12). The first business process execution may represent a single trace of the sequence of process steps that were performed during one execution of a predetermined business process. Graphing the business process may include defining a node for each process step that has been identified from the activity logs and forming edges between each node representing the order in which process steps were performed within the first business process execution. For example, where the first business process execution includes three steps, "A," "B," and "C," with step "A" being performed first, step "C" being performed second and step "B" being performed last, the graphing of this first execution may include three nodes, "A," "B," and "C" with a first edge connecting "A" and "C" and a second edge connecting "C" and "B." Each edge may be expressed as a vector showing both direction and thickness. Thus, an edge connecting "A" to "C" would be distinct from an edge that connects "C" with "A." The thickness of the edge represents a frequency with which the transition expressed by the edge occurs. For example, thick edges may represent a commonly occurring transition while a thin edge may represent an infrequently occurring transition.

After the first business process execution is graphed, the graph may be updated with additional business process executions (Step S13). Additional executions of business process may represent subsequent performances of business processes similar to the first business process that was graphed in Step S12. Subsequent performances may have been executed by the same or different individuals and/or automated systems. Data pertaining to the subsequent performances may be parsed from the same activity log as the first execution, different activity logs, or updated activity logs. For example, the logs may continue to be updated with new executions as the graph is being updated. In this respect, graphing may be performed concurrently with the execution of the business process.

For example, where business processes are executed within a large organization, a given business process may be executed hundreds or thousands of times a day. Activity logs pertaining to each execution of the particular business process may be used to update the graph, in real-time, so that the graph represents the most complete data set available. However, exemplary embodiments of the present invention are not limited to using all available data to generate and update the graph, and it would also be possible to select, at random or by other means, a subset of available data for the purposes of generating and updating the graph. Such a strategy may be desirable, for example, where the full set of data is particularly large.

In graphing the additional executions, new nodes may be added where new process steps are performed. Also, edge thicknesses may be updated to reflect changes to the frequency with which transitions occur from one step to another step. For example, each time a transition occurs from one step to another step, the edge connecting those steps may be increased in thickness by one measure. Alternatively, more sophisticated techniques for updating edge thickness may be performed, for example, as described in detail below.

The process of updating the graph with additional data (Step S13) may be repeated. Repetition may continue for a set number of iterations, until all activity log data has been reflected in the graph, or may continue indefinitely, updating the graph as new activity log data is collected.

Upon finishing the updating of the graph based on the collected activity log data, the graph may be presented (Step S14). Presentation of the graph may include actual display of the graph to one or more users, storing of the graph for future reference, or utilizing the graph in some other way. Presentment may also be performed continuously as the graph is updated in Step S13 rather than or in addition to being performed after completion of the updating of the graph. In this way, the graph may be presented as it is changed so that a user may observe the current state of the graph at any given point.

The presented graph may be checked to determine whether an alert is appropriate (Step S15). An alert may be appropriate where a particular threshold is exceeded. The threshold may be defined in accordance with user-selected criteria or other predetermined criteria. For example, the threshold may be a particular number of nodes, particular edge thicknesses, or excessive degree of deviation from a formalized process. Where the threshold is determined to have been exceeded (Yes, Step S15), an alert may be generated (Step S16). The alert may include the automatic sending of an email to one or more predetermined email addresses or some other form of notification.

An optional feature, according to exemplary embodiments of the present invention, is to extract a formal process model from the generated graph. As the graph may represent the processes that are actually performed, an organization wishing to formalize processes may utilize the generated graph as a basis for establishing the formal process.

In such a case, the formal process may be extracted from the generated graph, for example, after a predetermined length of time in which the graph is generated from and/or updated using activity log files. Alternatively, extraction may occur upon the occurrence of a predetermined triggering event such as when subsequent model updates no longer result in significant changes to the appearance of the graph or when certain properties in the graph change. For example, if the distance between the most recent businesses processes model graph and an initial graph is greater than a predetermined numeric range, formal model extraction may be triggered. Here, the numeric range may be calculated in accordance with the approaches for calculating snapshot values as described in detail below.

Where it is desired that a state of the graph at a particular point in time be stored for the purposes of comparing the graph to other graphs or the same graph at different points in time, a "snapshot" of the current state of the graph may be acquired (Step S17). The snapshot may include a copy of the graph as it existed during a particular instant, which would include both nodes and edges. The snapshot may also include meta data such as the date on which the activity log data used to generate the graph was acquired, a Boolean value indicating whether the graph exceeds an alert threshold, a counter indicating a number of times that a similar or identical graph has been encountered, or other pertinent data.

The snapshot may also be reduced to a particular snapshot value that in some way describes the characteristics of the graph relative to other graphs. There may be multiple approaches to characterizing a value for a particular snapshot. A simplified example of such an approach would be to count a total number of nodes and edges. More sophisticated metrics may also be used to represent a process model graphs in terms of a numeric value. These values may then be used to calculate a measure of difference between two process model graphs in terms of a "distance" between values. This distance between two process models M and M' may be defined as a minimum number of high-level change operations (e.g. to insert, delete or move activities) needed for transforming M into M'. Determining the distance between two process models may be expressed as a non-deterministic polynomial-time hard problem. Heuristic algorithms applied towards this problem may be quite complex. Accordingly, exemplary embodiments of the present invention may define one or more metrics to assign a numerical value to each process model graph snapshot. As used herein, $f(s_k)$ represents the metric function that assigns a value to each snapshot $s_k$.

According to a first approach, $$f(s_k) = \frac{1}{|E + V|},$$

where E is the number of edges, and V is the number of vertices (nodes) in the dependency graph of a process snapshot $s_k$.

While the approach described above provides an example of a method in which a process model graph and/or snapshot may be expressed as a simple scalar value for the purposes of comparison, other appropriate metrics may be used as well and the invention should not be understood as being limited to the particular approaches set forth above.

While the simple scalar represents a convenient approach to categorizing a process model graph at a particular point in time (snapshot), the entire snapshot, however, may be stored for future reference and/or comparison, using a suitable data structure. Exemplary embodiments of the present invention may store snapshots within a tree-like data structure, for example, a B-Tree data structure or a numeric trie data structure (Step S18). A trie data structure is one in which data is stored and arranged in a tree of groups and subgroups that are divided in accordance with particular meaningful properties that may facilitate search. The trie data structure includes a root node, one or more bin nodes within the root, and a sequence of bucket nodes within each bin node. Each bin includes a subset of all root data and is defined by a particular range in which the subset of data falls. Each bucket includes a subset of its parent bin range and is defined by the range of data that it includes. There is no requirement that all bins represent equally-sized ranges and similarly there is no requirement that all buckets represent equally-sized ranges. Accordingly, the size of a bin's or bucket's range may be different for different bins and buckets. The trie data structure may also be rebalanced when it is desired that the ranges be changed.

Thus, a numeric trie data structure is one in which the bins and buckets represent particular numeric ranges, which here may be the snapshot value discussed above. Bins may be stored in the form of ordered lists. This may permit the performance of a binary search to quickly find the desired snapshot, for example, by snapshot value. The number of bucket nodes per bin node, also referred to as the branching ratio, may be the same for all bins. Similarly, the maximum number of bins per bucket may be fixed at some relatively low value, for example, to enable efficient retrieval.

The range of a bucket may be referred to as a sub-range since it may be a subset of a parent bin's range. The ranges and sub-ranges of bins and buckets, respectively, are non-overlapping with respect to their siblings.

An optional feature, according to exemplary embodiments of the present invention, may include applying one or more rules to the generated graph to determine business semantics for one or more nodes or edges of the graph (Step S19). Formal business process models may then be extracted from the graph, for example, using the determined business semantics. Multiple extracted formal business process models may then be stored in a data structure. The data structure used may allow for efficient retrieval and the ability to raise alerts based on changes between the multiple extracted formal business process models.

Figure 2:
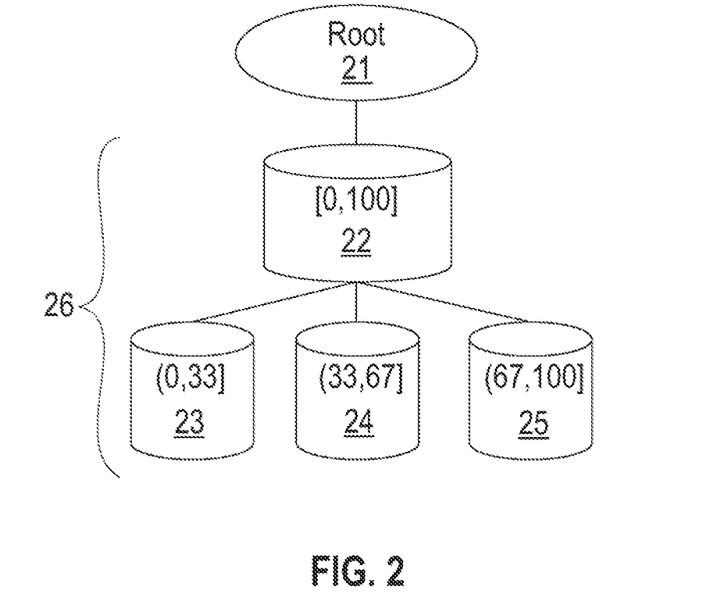
FIG. 2 illustrates an example of a numeric trie data structure that may be used to store business process graph snapshots according to an exemplary embodiment of the present invention.

FIG. 2 illustrates an example of a numeric trie data structure that may be used to store business process graph snapshots according to an exemplary embodiment of the present invention. A root 21 represents the entire data set. From the root, there may be a first bin 22. There may be more than one bin, however, in the example shown there is one bin 22. The range of the bin 22, here [0,100] represents the fact that snapshots with scalar snapshot values from 0 to 100 are stored therein. A first level 26 may be defined as the bin 22 and all child buckets 23, 24, and 25. The first child bucket 23 may have a range [0,33] and thus may contain snapshots with scalar snapshot values from 0 to 33. The second child bucket 24 may have a range (33,67] and thus may contain snapshots with scalar snapshot values from 34 to 67. The third child bucket 25 may have a range (67,100] and thus may contain snapshots with scalar snapshot values from 68 to 100. Between all three child buckets, the complete bin range of [0,100] is represented.

The numeric trie data structure may be flexible enough to accommodate the addition of business process graph snapshots with snapshot values that are beyond the present range of the available bins. For example, where new data is presented for a business process graph snapshot having a snapshot value of, for example, 158, an additional bin may be added to the numeric trie data structure, for example, representing a range of (100,200]. Within this bin, new buckets may be added, for example, as needed, to accommodate the new data.

The numeric trie data structure may also be flexible enough to be rebalanced. Rebalancing is the changing of bin and bucket ranges and the accompanying replacement of data from one category to another. Rebalancing may be desired where, for example, a large number of values are added to any one category. By rebalancing the data structure, search can remain efficient and an overflow of bins may be avoided.

Approaches to rebalancing the numeric trie data structure according to exemplary embodiments of the present invention may include adding additional bins and reducing the size of the bin ranges. This would have the effect of keeping the tree shallow and adding to the width of the tree. Alternatively the branching ratio may be increased leading to additional organizational levels. The first option may facilitate a quick and computationally inexpensive search using binary search techniques by reducing the time required to work its way down from root to bins. Similarly, the second option may also not be computationally expensive as search across buckets may be made fast. As the process of rebalancing itself may be computationally expensive, exemplary embodiments of the present invention may reduce the computational costs associated with rebalancing by permitting bins to have child bins rather than buckets, thereby creating a second level.

Figure 3:
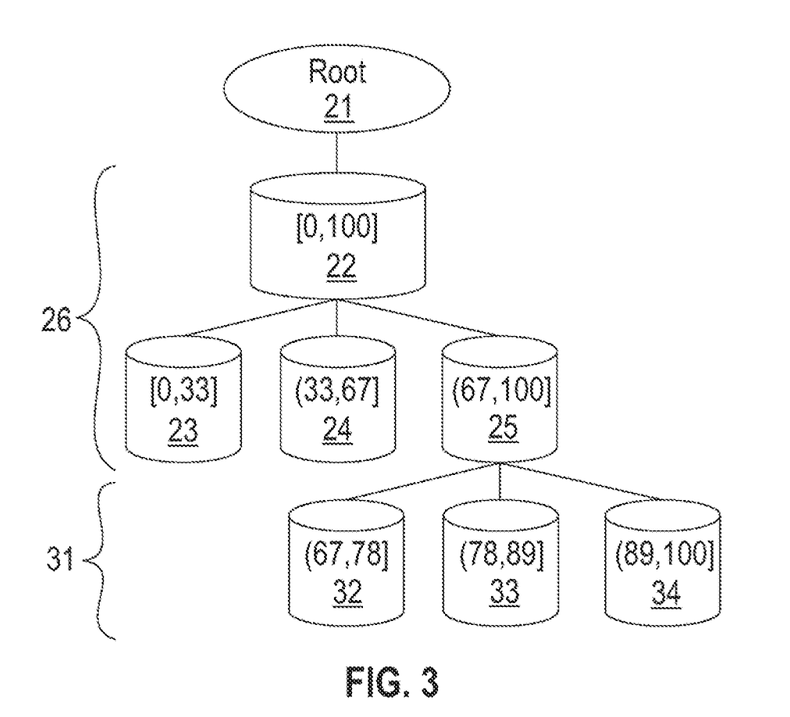
FIG. 3 illustrates an example of a numeric trie data structure with multiple levels according to an exemplary embodiment of the present invention.

FIG. 3 illustrates an example of a numeric trie data structure with multiple levels according to an exemplary embodiment of the present invention. Here, the bin 25 of the first level 26 may be a bucket with respect to a second level 31 and within that bucket, there may be multiple bins 32, 33, and 34. By allowing for additional levels, the need to rebalance the numeric trie may be lessened and computational expense may be avoided.

Moreover, by allowing a bin node to have a child bin rather than a bucket, an arbitrary number of levels may be created while retaining the initial bin width (100 as shown in the example of FIG. 3) and branching ratio (3 as shown in the example of FIG. 3), and bucket size. Exemplary embodiments of the present invention may then allow for search within the numeric trie data structure in such a way that accommodates an arbitrary trie depth. For example, it may be determined whether a given child of a bin is a bucket or a bin. If the child is a bucket, then a linear search through the bucket may be performed and if the child is a bin, recursive descent may be performed.

In addition to allowing for storage and efficient retrieval of process snapshots, the numeric trie data structure may also facilitate the generation of alerts. Alerts may be generated on the basis of factors such as (1) a number of snapshots in any given bucket. If the number of snapshots in any single bucket exceeds a particular threshold, an alert may be generated, for example, prior to rebalancing the numeric trie. Additionally, alerts may be generated based on (2) the location of snapshots. For example, if a particular bucket has one or more snapshots, an alert could be raised that conveys the message that those snapshots have a numeric value within a particular range (e.g. the range of the bucket).

The dependency graph, transition vectors, and other stored metadata of the snapshots that cause the alert to be raised may be analyzed to provide insight into the nature of the situation that triggers the alert. Alerts may be used as a precautionary measure for organizations such as banks and insurance companies to check and verify their business process. Alerts may also be raised when the process is not compliant with particular procedures or guidelines. For example, an organization may assign metric values to each process snapshot such that they establish a list of ranges of snapshot metric values that indicate that the process is not compliant with guidelines. In this case the organization may mark bins in the numeric trie corresponding to these ranges to raise alerts when more than a given number of snapshots are stored in them. Furthermore, the organization may then analyze the snapshots in these bins to gain a better understanding of when, how frequently and under what circumstances the process is non-compliant.

To prevent dramatic storage overload in the numeric trie, a user may decide to store a subset of snapshots and may thus decline to store a remainder of the snapshots. The user may accomplish this by, for example, specifying criteria for determining whether a snapshot is to be stored. While the present invention is not limited to any particular criteria, exemplary embodiments of the present invention may utilize a measure of topological change as criteria for storing snapshots. For example, the user may initialize a metric to detect noticeable topological changes between two consecutive snapshots and storage of the snapshot may then depend upon the metric. Topological change T may, for example, be defined in terms of a function of nodes and edges of the graph. An example of such a function could be as follows:

$$T(s_t, s_{t-1}) = f(k_1(|e(s_t) - e(s_{t-1})|) + k_2(|v(s_t) - v(s_{t-1})|))$$

where $e(s_t)$ represents the total number of edges in snapshot $s_t$, $v(s_t)$ represents the total number of vertices in snapshot $s_t$, and where $k_1$ and $k_2$ are constants that may be, for example, set by a user. If the topological change between $s_{t-1}$ and $s_t$ is greater than a pre-specified threshold, the snapshot $s_t$ may be stored.

To implement the storage of snapshots in the numeric trie data structure, the following process may be used. First, at a specified interval, a process snapshot may be taken. The process snapshot may consist of the dependency graph with vertices, edges, and a transition probabilities vector at every vertex, for example, as described in detail above. Next, a numeric value may be computed for the snapshot using a predetermined metric. It may then be checked whether the present snapshot represents a topological change from the last-stored snapshot that is sufficiently large to satisfy predetermined threshold criteria. When the topological change is determined to be sufficiently large, the snapshot may be stored within the numeric trie data structure, for example, along with appropriate metadata, according to its numeric value. It may then be determined whether the newly added data satisfies predetermined criteria for generating an alert, and when this criteria is satisfied, an appropriate alert may be generated. This process may then be repeated at the next specified interval.

Figure 4A:
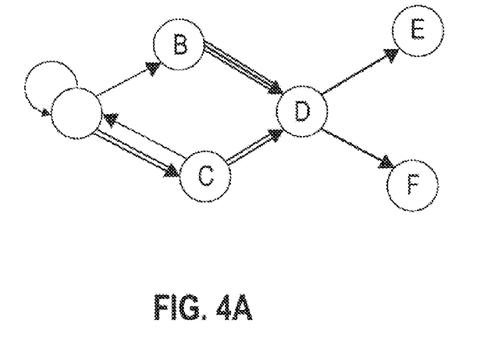
FIG. 4A is an example of a business process graph generated in accordance with exemplary embodiments of the present invention.
Figure 4B:
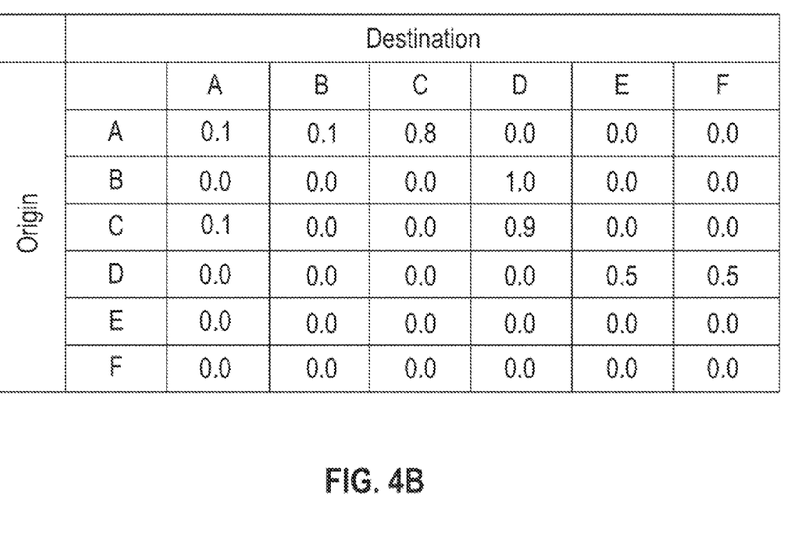
FIG. 4B is a table illustrating transition ratios represented by the edge thicknesses of the graph of FIG. 4A.

FIG. 4A is an example of a business process graph generated in accordance with exemplary embodiments of the present invention and FIG. 4B is a table illustrating transition ratios represented by the edge thicknesses of the graph of FIG. 4A. As described above, exemplary embodiments of the present invention may generate a graph representing an observed frequency with which actual business process executions transition from business process step to business process step wherein each node of the graph represents a step in the business process and each edge connecting various nodes represents an observed rate of transition from the originating node to the destination node. This rate of transition may represent the frequency with which the business process step represented by the destination node follows from the business process step represented by the originating node. The rate of transition may be expressed as a cumulative number of times that such a transition occurred or may be expressed as a ratio of the number of times the given transition occurred over the total number of transitions originating from the given node.

The rate of transition may be conceptualized as a "transition probability" as this value may represent an inferred probability that after the business process step represented by the originating node is performed, the business process step represented by the destination node will follow. However, the transition probability does not represent a prior knowledge about the odds of such a transition occurring in the future. The rate of transition, or transition probability from a node "a" to a node "b" may be expressed as $\phi_a^b$.

As can be seen in the exemplary graph of FIG. 4A, there are six nodes representing observed business process steps. At each node, edges (shown as arrows) represent the observed rate of transitions, with thicker edges representing larger rates of transitions. It can thus be seen that most often, after the business process step associated with node "A" is performed; the business process step associated with node "C" is performed thereafter. However, there are times when the business process step associated with node "B" is performed thereafter, or the business process step associated with node "A" is repeated. The table of FIG. 4B shows exemplary rates of transition that may be consistent with the exemplary graph of FIG. 4A. As can be seen, the total of all rates of transition from a first node to a second node add up to either one, in the case where such transitions are found, or zero, in the case where no transitions are found, for example, where a business process step associated with a given node is the terminal step in the business process. For example, the sum of $\phi_A^A + \phi_A^B + \phi_A^C + \phi_A^D + \phi_A^E + \phi_A^F = 1$ while the sum of $\phi_F^A + \phi_F^B + \phi_F^C + \phi_F^D + \phi_F^E + \phi_F^F = 0$ because node "F" represents a terminating step.

Although the rate of transition is described above as representing a ratio of transitioning from a first node to a second node over the total number of transitions from the first node, other more sophisticated approaches to calculating the rate of transition may be used. For example, where it is desired that more recent transitions be more heavily weighted than transitions that have not been observed recently, exemplary embodiments of the present invention may provide various techniques to express the desired weighting into the calculation of the rates of transition. For example, some exemplary embodiments of the present invention may utilize an "ant colony optimization" based approach to transition rate calculation. Ant colony optimization is an approach based on the manner in which ants leave behind scent (also known as pheromone) trails to help each other locate sources of food. As each ant leaves behind a scent trail, the more ants travel along the same path from a food source, the stronger the scent path becomes. As scent paths have a tendency to evaporate, paths not reinforced by additional ants may decay.

As applied to exemplary embodiments of the present invention, rates of transition may be bolstered by additional transitions from a given origin node to a given destination node but may also decay over time when not reinforced. This technique may be implemented, for example by updating a transition rate from a node "a" to a node "b" when such a transition is detected in an activity log using the following equation:

$$\phi_a^b(t+1) = \phi_a^b(t) \cdot (1-r) + r \quad (1)$$

where $\phi_a^b(t)$ represents the initial transition rate, $\phi_a^b(t+1)$ represents the new transition rate and r represents a reinforcement parameter that may depend on a counting of the number of times the transition was observed from the activity logs.

The reinforcement parameter, according to exemplary embodiments of the present invention, may be defined as r=f(cost(a,b)), where r is a function of the cost of an edge in the transition from a to b. Here, cost(a,b) may be a cost function that may be set according to user preferences where it is desired that certain transitions should carry a higher cost than others, as described in detail below.

The remaining transition rates $\phi_a^k(t+1)$ from a state a to a state k may be decayed at a time t+1, for example, in accordance with the following equation:

$$\phi_a^k(t+1) = \phi_a^k(t) - \phi_a^k(t)r \quad (2)$$

As described above, an alternative to updating the transition ratios with decay is to update the transition ratios based only on their level of occurrence within the activity logs. For example, to update the transition ratio for an edge $e_1$, from node "a" to node "b" is to keep a count, denoted as $c(e_1)$, of the number of times $e_1$ is detected in traces of actual business process executions, described herein as 1 ..., T, where T is the most recently received trace, and a total of |T| traces have been received so far. Thus $\phi_a^b(t+1)$ may be calculated, for example, in accordance with the following equation:

$$\phi_a^k(t+1) = \frac{c(e_1)}{|T|} \quad (3)$$

According to exemplary embodiments of the present invention, in updating the transition ratio from $\phi_a^b(t)$ to $\phi_a^b(t+1)$ based on activity log data, a credibility function may optionally be taken into effect. A credibility function may be used to adjust the weighing of occurrences of particular transitions. For example, where it is known that certain transitions may be characteristic of normal operation, instances of these transitions drawn from the activity logs may be more heavily weighted than instances of transitions that are understood as highly unusual. In this way, the generation of the business process graph may be skewed more towards credible transitions and less towards suspicious transitions.

The credibility functions themselves may be provided by a user, for example, taking into account real-world constraints that would make certain transitions unlikely and/or impossible. Users may choose which transitions to skew or may choose not to skew any transitions with credibility functions. This feature, as described above, may be optionally implemented.

Instead of minimizing the significance of unreasonable transitions on the generated business model graph using the credibility functions, credibility functions may also be used to give increased exposure and prominence to certain transitions that may be suspicious. For example, where a business process generally flows from "A" to "B" to "C" because, for example, step "B" is a step in which approval is sought, a transition directly from "A" to "C" may be assigned a credibility function that increases the prominence of such a transition on the generated graph so that suspicious transitions such as these may more easily draw the attention of users who observe the generated graphs while more ordinary transitions are given less prominence.

Figure 5:
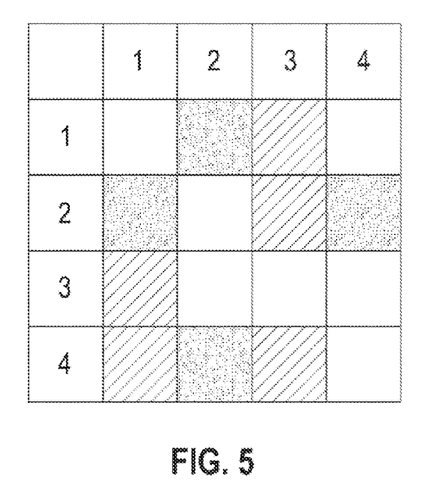
FIG. 5 illustrates an example image-based format for displaying a representation of a business process graph snapshot according to an exemplary embodiment of the present invention.

Exemplary embodiments of the present invention may provide for an approach for displaying a representation of a business process graph snapshot in a highly insightful image-based format. FIG. 5 illustrates an example image-based format for displaying a representation of a business process graph snapshot according to an exemplary embodiment of the present invention.

As shown in FIG. 5, a plurality of process snapshot may be represented within a single image. Where there are $n^2$ total snapshots, these snapshots may be mapped to an image of size n by n pixels as shown in FIG. 5 using a mapping function. The mapping function so used may utilize the topology, credibility function and/or transition ratios of the snapshots to generate a unique color value for each snapshot and then display that color value as a pixel in the mapping. The color value may be of any desired color depth from 2-bit color (black or white) to, for example, 24-bit color, where each possible color is represented in terms of an 8-bit red level, an 8-bit green level and an 8-bit blue level.

The mapping function may be fitted to the final single image, including all n×n pixels, using, for example, standard mathematical packages such as Mathematica. Then, for example, by taking the derivative of this polynomial, a rate of change between consecutive snapshots of the mined business process model graph may be determined and displayed.

Figure 6:
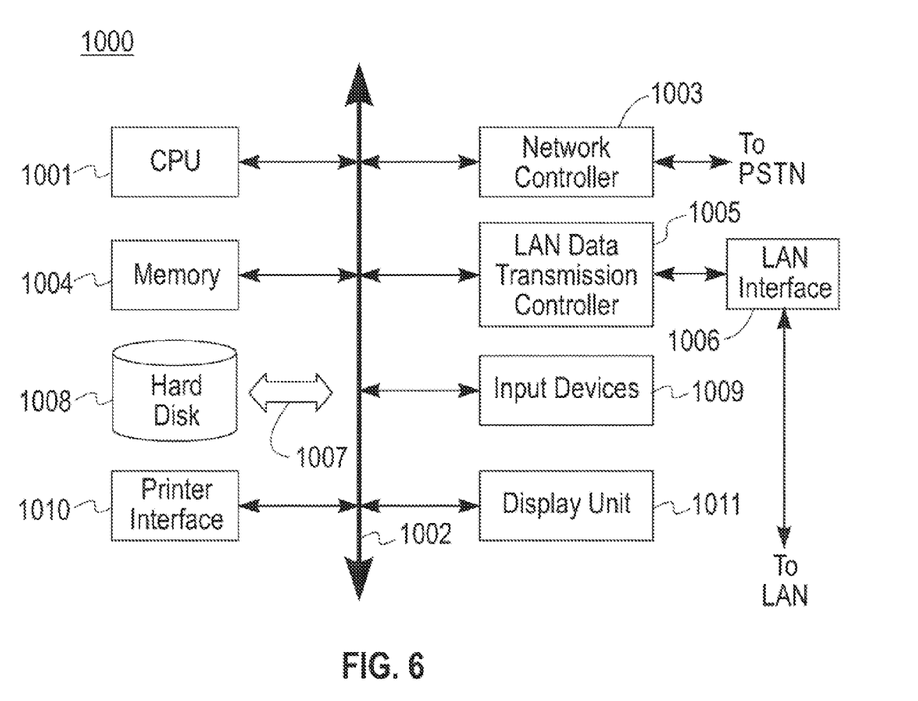
FIG. 6 shows an example of a computer system capable of implementing the method and apparatus according to embodiments of the present disclosure.

FIG. 6 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A computer-implemented method for modeling a process, comprising:

receiving a plurality of graphs representing a business process at a plurality of different times wherein for each graph, process steps of the business process are represented as nodes, edges connecting pairs of nodes represent transitions between process steps, and thicknesses of the edges reflect frequencies of the transitions between the process steps;

calculating a numeric value representative of graph appearance for each of the plurality of received graphs based on the nodes, edges, and edge thicknesses using a distance function that computes a measure of dissimilarity between two graphs of the plurality of graphs;

storing each of the plurality of received graphs within a tree-like data structure according to its corresponding numeric value;

determining a measure of dissimilarity between the process at each of the plurality of different times and a standard version of the process based on the plurality of received graphs stored in the tree-like data structure and a standard graph representing the standard version of the process; and generating an alert when the determined measure of dissimilarities indicate that the business process has changed beyond a predetermined level within a set period of time, wherein each of the above steps is performed using a computer system, and wherein each of the received plurality of graphs is generated by automatically parsing one or more activity log files generated in the course of executing the one or more business processes by a plurality of computerized platforms involved in executing the one or more business processes.

2. The computer-implemented method of claim 1, wherein each of the received plurality of graphs is generated by:

collecting data pertaining to executed process steps from the one or more activity log files;

automatically parsing the collected data to determine a set of process steps that have been performed;

determining an incidence value representing how many times each performed process step follows each of the other performed process steps of the collected data; and generating a graph representing a model of the executed process by representing each process step that has been performed as a node of the graph and each transition between process steps as an edge on the graph, wherein for any given pair of nodes of the graph, the edge connecting the pair of nodes is assigned a number that depends upon the incidence value corresponding to how many times the process step represented by a first node of the pair is followed by the process step represented by a second node of the pair.

3. The computer-implemented method of claim 1, wherein the plurality of graphs represents snapshots of a dynamic graph at predetermined temporal intervals, at user-specified intervals, or upon satisfaction of a triggering criterion.

4. The computer-implemented method of claim 1, wherein the tree-like data structure is a numeric trie data structure.

5. The computer-implemented method of claim 1, wherein when there are more than a predetermined number of graphs stored in a single bucket or bin of the tree-like data structure, an alert is generated.

6. The computer-implemented method of claim 1, wherein generating the alert when the determined measure of dissimilarities indicates that the business process has changed beyond the predetermined level within the set period of time includes determining when the numeric value of a particular graph deviates by an amount in excess of a predetermined threshold from a numeric value representing the standard graph.

7. The computer-implemented method of claim 1, wherein each graph includes representation of additional data in addition to nodes and edges.

8. The computer-implemented method of claim 1, wherein the edges of each graph are based on an incidence value representing how many times each process step follows each of the other process steps within the graphed processes.

9. The computer-implemented method of claim 1, wherein the edges of each graph are based on an incidence value representing a probability by which each process step follows each of the other process steps within the graphed processes.

10. A computer-implemented method for modeling a process, comprising:

receiving a plurality of graph snapshots representing a dynamic business process at various instantaneous points in time, wherein for each snapshot, a sequence of process steps of the processes are represented as nodes, edges connecting pairs of nodes represent transitions between process steps, and thicknesses of the edges reflect frequencies of the transitions between the process steps;

calculating a numeric value representative of graph appearance for each of the plurality of received snapshots based on the nodes, edges, and edge thicknesses using a distance function that computes a measure of dissimilarity between two graph snapshots of the plurality of graph snapshots;

storing each of the plurality of received snapshots within a tree-like data structure according to its corresponding numeric value, wherein each of the above steps is performed using a computer system;

determining a measure of dissimilarity between the process at each of the various instantaneous points of time and a standard version of the process based on the plurality of received snapshots stored in the tree-like data structure and a standard graph representing the standard version of the process; and generating an alert when the determined measure of dissimilarities indicate that the dynamic business process has changed beyond a predetermined level within a set period of time, wherein each of the received plurality of graphs is generated by automatically parsing one or more activity log files generated in the course of executing the dynamic business process by a plurality of computerized platforms involved in executing the dynamic business process.

11. The computer-implemented method of claim 10, wherein the tree-like data structure is a numeric trie data structure.

12. The computer-implemented method of claim 10, wherein when there are more than a predetermined number of snapshots stored in a single bucket or bin of the tree-like data structure, an alert is generated.

13. The computer-implemented method of claim 10, wherein when the numeric value of a particular snapshot deviates by an amount in excess of a predetermined threshold from a numeric value representing a snapshot of a known state, an alert is generated.

14. The computer-implemented method of claim 13, wherein the snapshot of a known state is a snapshot representing an earlier point in time than is represented by the particular snapshot.

15. A computer program product for modeling a process, the computer program product comprising:

a non-transitory computer readable storage medium having computer readable program code embodied therewith, the computer readable program code comprising:

computer readable program code configured to receive a plurality of graphs representing a business process at a plurality of different times wherein for each graph, process steps of the business process are represented as nodes, edges connecting pairs of nodes represent transitions between process steps, and thicknesses of the edges reflect frequencies of the transitions between the process steps;

computer readable program code configured to calculate a numeric value representative of graph appearance for each of the plurality of received graphs based on the nodes, edges, and edge thicknesses;

computer readable program code configured to store each of the plurality of received graphs within a tree-like data structure according to its corresponding numeric value;

computer readable program code configured use a distance function to determine a measure of dissimilarity between the process at each of the plurality of different times and a standard version of the process based on the plurality of received graphs stored in the tree-like data structure and a standard graph representing the standard version of the process; and computer readable program code configured to generate an alert when the determined measure of dissimilarities indicate that the business process has changed beyond a predetermined level within a set period of time, wherein each of the received plurality of graphs is generated by automatically parsing one or more activity log files generated in the course of executing the one or more business processes by a plurality of computerized platforms involved in executing the one or more business processes.

\* \* \* \* \*